United States Patent
Kraus

(10) Patent No.: US 11,861,500 B2
(45) Date of Patent: Jan. 2, 2024

(54) META-LEARNING SYSTEM

(71) Applicant: Siemens Healthcare GmbH, Erlangen (DE)

(72) Inventor: Martin Kraus, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 1186 days.

(21) Appl. No.: 16/225,034

(22) Filed: Dec. 19, 2018

(65) Prior Publication Data

US 2019/0197360 A1 Jun. 27, 2019

(30) Foreign Application Priority Data

Dec. 22, 2017 (EP) .................................. 17210056

(51) Int. Cl.
*G06N 3/084* (2023.01)
*G06F 18/21* (2023.01)
(Continued)

(52) U.S. Cl.
CPC ............ *G06N 3/084* (2013.01); *G06F 18/214* (2023.01); *G06F 18/217* (2023.01); *G06N 3/04* (2013.01); *G06N 3/08* (2013.01); *G06N 7/00* (2013.01)

(58) Field of Classification Search
CPC ............ G06N 7/00; G06N 20/00; G06N 3/04; G06N 3/08; G06N 3/084; G06N 99/005; G06K 9/6262; G06K 9/6256
See application file for complete search history.

(56) References Cited

U.S. PATENT DOCUMENTS

2014/0279741 A1* 9/2014 Sow .................. G06N 20/00
706/12
2017/0337682 A1 11/2017 Liao et al.
(Continued)

FOREIGN PATENT DOCUMENTS

CN 109034175 A * 12/2018
EP 3252671 A1 12/2017

OTHER PUBLICATIONS

Finn et al., "Meta-Learning and Universality: Deep Representations and Gradient Descent Can Approximate Any Learning Algorithm" Dec. 20, 2017, arXiv: 1710.11622v2, pp. 1-20. (Year: 2017).*
(Continued)

*Primary Examiner* — Ying Yu Chen
*Assistant Examiner* — Sidney Vincent Bostwick
(74) *Attorney, Agent, or Firm* — Harness, Dickey & Pierce, P.L.C.

(57) ABSTRACT

A meta-learning system includes an inner function computation module, adapted to compute output data from applied input data according to an inner model function, depending on model parameters; an error computation module, adapted to compute errors indicating mismatches between the computed output data and target values; a state update module, adapted to update the model parameters of the inner model function according to an updated state, updated based on a current state of the state update module, in response to an error received from the error computation module. The state update module is learned to adjust the model parameters of the inner model function, such that a following training of the inner model function with training data is improved.

28 Claims, 2 Drawing Sheets

(51) Int. Cl.
  *G06F 18/214* (2023.01)
  *G06N 3/04* (2023.01)
  *G06N 3/08* (2023.01)
  *G06N 7/00* (2023.01)

(56) References Cited

U.S. PATENT DOCUMENTS

2019/0034798 A1* 1/2019 Yu ............................ G06N 3/04
2019/0147298 A1* 5/2019 Rabinovich .......... G06N 3/0454
                                                            382/157
2020/0258006 A1* 8/2020 Chen .................. G06Q 30/0255

OTHER PUBLICATIONS

Li et al., "Meta-SGD: Learning to Learn Quickly for Few-Shot Learning" Sep. 28, 2017, arXiv: 1707.09835v2, pp. 1-11. (Year: 2017).*
Sung et al., "Learning to Learn: Meta-Critic Networks for Sample Efficient Learning" Jun. 19, 2017, arXiv: 1706.09529v1, pp. 1-12. (Year: 2017).*
Wang et al., "Learning to Model the Tail" Dec. 4, 2017, pp. 1-11. (Year: 2017).*
Li et Turner "Gradient Estimators for Implicit Models" Oct. 27, 2017, arXiv: 1705.07107v2, pp. 1-18. (Year: 2017).*
Shen et al., "Meta Networks for Neural Style Transfer" Sep. 13, 2017, arXiv: 1709.04111v1. (Year: 2017).*
Mishra et al., "Meta-Learning with Temporal Convolutions" Aug. 4, 2017, arXiv: 1707.03141v2, pp. 1-14. (Year: 2017).*
Ravi et al., "Optimization as a Model for Few-Shot Learning" Mar. 1, 2017, pp. 1-11. (Year: 2017).*
Garcia et Bruna "Few-Shot Learning with Graph Neural Networks" Nov. 10, 2017, arXiv: 1711.04043v1, pp. 1-12. (Year: 2017).*
Reed et al., "Few-Shot Autoregressive Density Estimation: Towards Learning to Learn Distributions" Nov. 22, 2017, arXiv: 1710.10304v2, pp. 1-11. (Year: 2017).*
Schweighofer, Nicolas, and Kenji Doya. "Meta-learning in reinforcement learning." Neural Networks 16.1 (2003): 5-9. (Year: 2003).*
Schaal, Stefan, and Christopher G. Atkeson. "Learning control in robotics." IEEE Robotics & Automation Magazine 17.2 (2010): 20-29. (Year: 2010).*
Sutton, Richard S., et al. "Policy gradient methods for reinforcement learning with function approximation." Advances in neural information processing systems 12 (1999). (Year: 1999).*
Wang, Jane X., et al. "Learning to reinforcement learn." arXiv preprint arXiv:1611.05763 (2016). (Year: 2016).*
Georgakopoulos "A novel adaptive learning rate algorithm for convolutional neural network training." Engineering Applications of Neural Networks: 18th International Conference, EANN 2017, Athens, Greece, Aug. 25-27, 2017, Proceedings. Springer International Publishing, 2017. (Year: 2017).*
Fu, Jie et al. "Deep Q-Networks for Accelerating the Training of Deep Neural Networks"; arXiv:1606.01467 [cs.LG]; Retrieved from the Internet: URL:https://arxiv.org/pdf/1606.01467v1.pdf.
Meier, Franziska et al. "Online Learning of a Memory for Learning Rates", arXiv: 1709.06709 [cs.LG] / arXiv:1709.06709v2 [cs.LG], XP080821945.
Merity, Stephen et al. "Revisiting Activation Regularization for Language RNNs" arXiv:1708.01009 [cs.CL] or arXiv:1708.01009v1 [cs.CL] URL:https://arxiv.org/pdf/1708.01009.pdf.
Ravi, Sachin et al. "Optimization as a Model for Few-Shot Learning" Conference Paper at ICLR 2017, pp. 1-11, XP055483082; Retrieved from the internet: URL:https://openreview.net/pdf?id=rJYO-Kcl.
Andrychowicz, Marcin et al. "Learning to learn by gradient descent by gradient descent" 30th Conference on Neural Information Processing Systems; Nov. 2016; arXiv:1606.04474v2 [cs.NE].
European Search Report with Patent Application No. 17210056.2 dated Jul. 11, 2018.
Huang, De-Shuang: "The further discussions on constrained learning algorithms", Institute of Electrical and Electronics Engineers, IJCNN 2003. Proceedings of the International Joint Conference On Neural Networks 2003. Portland, OR, Jul. 20-24, 2003; [International Joint Conference On Neural Networks], New York, NY : IEEE, US, vol. 3, Jul. 20, 2003 (Jul. 20, 2003), pp. 1868-1872, XP010652793.

* cited by examiner

META-LEARNING SYSTEM

PRIORITY STATEMENT

The present application hereby claims priority under 35 U.S.C. § 119 to European patent application number EP 17210056.2 filed Dec. 22, 2017, the entire contents of which are hereby incorporated herein by reference.

FIELD

Embodiments of the invention generally relate to a system for a meta-learning which can be used for learning an inner model function, in particular a neural network.

BACKGROUND

A meta-learning system can be considered as an abstraction level up from a normal learning system. Whereas in a normal learning system inference is performed by the production of outputs from inputs, in a meta-learning system inference is the training of a learning system. Normal learning systems using neural networks are e.g. known from US 2017/0337682 A1 and EP 3252671 A1. Meta-learning in general is a subfield of machine learning where automatic learning algorithms can be applied on meta data about machine learning processes. In the field of artificial intelligence, model functions such as neural networks are usually trained on a relatively large labelled training set of data using standard algorithms such as stochastic gradient descent. Such standard algorithms require to look at the received training data many times during the training process. Furthermore, problems of model complexity and hyper parameter selection need usually be solved manually by a human expert. In a conventional artificial intelligence system, output data can be computed on the basis of input data according to a function depending on parameters. Errors are computed indicating mismatches between the computed output data and target values. In a conventional system, an optimizer function can be trained which controls the parameters of an error function which is to be optimized. The error function can be modelled to depend only on the current parameters. In a conventional artificial intelligence system, only the overall prediction error is minimized. This may lead to unnecessary updates while minimizing the prediction error.

SUMMARY

At least one embodiment of the present invention provides a meta-learning system which can improve learning of a model function, in particular in situations where there is little training data but much available data available for similar problems.

At least one embodiment of the present invention is directed to a meta-learning system.

At least one embodiment of the present invention provides a meta-learning system comprising an inner function computation module adapted to compute output data from applied input data according to an inner model function depending on model parameters;

an error computation module adapted to compute errors indicating mismatches between the computed output data and target values; and a state update module adapted to update the model parameters of the inner model function according to an updated state which is updated based on a current state of the state update module in response to an error received from the error computation module, wherein the state update module is learned to adjust the model parameters of the inner model function such that a following training of the of the inner model function with training data is improved or even optimized.

BRIEF DESCRIPTION OF THE DRAWINGS

In the following, possible embodiments of the meta-learning system according to the present invention are described in more detail with reference to the enclosed figures.

DETAILED DESCRIPTION OF THE EXAMPLE EMBODIMENTS

Figure 1:
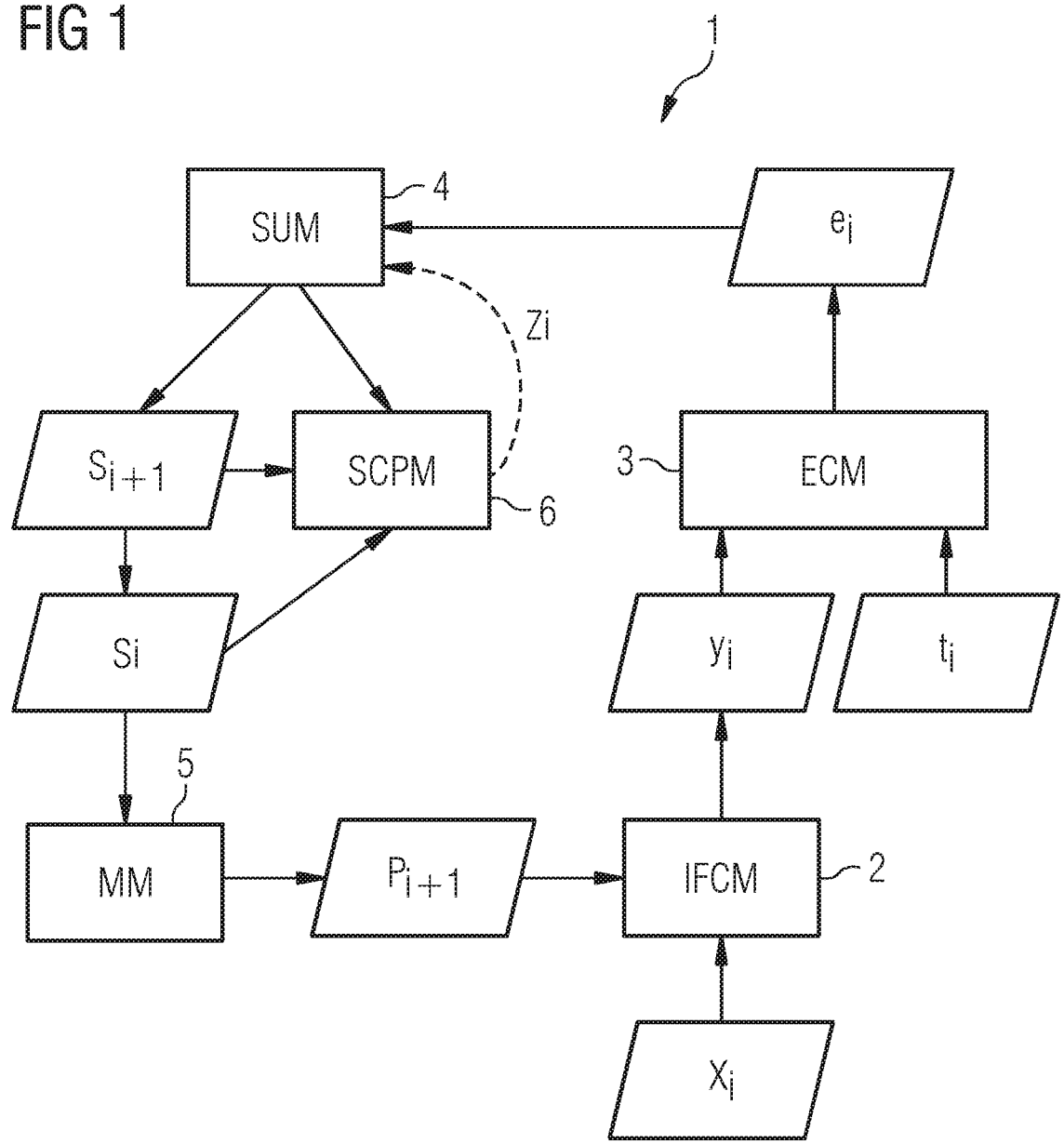
FIG. 1 shows a diagram for illustrating a first possible example embodiment of the meta-learning system according to the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

At least one embodiment of the present invention provides a meta-learning system comprising an inner function computation module adapted to compute output data from applied input data according to an inner model function depending on model parameters;

an error computation module adapted to compute errors indicating mismatches between the computed output data and target values; and a state update module adapted to update the model parameters of the inner model function according to an updated state which is updated based on a current state of the state update module in response to an error received from the error computation module, wherein the state update module is learned to adjust the model parameters of the inner model function such that a following training of the inner model function with training data is improved or even optimized.

In a possible embodiment of the meta-learning system according to the first aspect of the present invention, in a first learning phase the state update module is learned using labelled learning data applied to adjust the model parameters of the inner model function of the inner function computation module.

In a still further possible embodiment of the meta-learning system according to the first aspect of the present invention, in a subsequent training phase following the learning phase, the inner model function of the inner model function module is trained using training data applied to the inner function computation module.

In a further possible embodiment of the meta-learning system according to the first aspect of the present invention, the inner function computation module comprises a neural network.

In a further possible embodiment of the meta-learning system according to the first aspect of the present invention, the inner function computation module comprises a deep neural network implementing the inner model function.

In a further possible embodiment of the meta-learning system according to the first aspect of the present invention, the neural network comprises weights and biases changed according to the updated state of the state update module.

In a still further possible embodiment of the meta-learning system according to the first aspect of the present invention, a state to parameter mapping module is configured to map the updated state of the state update module to model parameters used by the inner model function of the inner function computation module in the next time step.

In a still further possible embodiment of the meta-learning system according to the first aspect of the present invention, the state to parameter mapping module is configured to map the updated state of the state update module to the model parameters used by the inner model function of the inner function computation module in the next time step according to a predetermined mapping function.

In a possible embodiment of the meta-learning system according to the first aspect of the present invention, the predetermined mapping function is formed by an identity function.

In a further possible embodiment of the meta-learning system according to the first aspect of the present invention, a state change penalizing module is provided adapted to compare the updated state with a current state of the state update module and to associate a state change penalty with an observed change in state.

In a still further possible embodiment of the meta-learning system according to the first aspect of the present invention, the inner function computation module is trained to minimize the errors computed by the error computation module and to minimize changes in the state of the state update module expressed by associated state change penalties provided by the state change penalizing module.

In a still further possible embodiment of the meta-learning system according to the first aspect of the present invention, a learning decision module is provided adapted to compute a learning strength based on the error computed by the error computation module and other data in particular gradients, input data, processed input data.

In a still further possible embodiment of the meta-learning system according to the first aspect of the present invention, a state combination module is provided adapted to combine the current state and the updated state received from the state update module using the learning strength provided by the learning decision module to adjust the updated state supplied to the state to parameter mapping module.

In a still further possible embodiment of the meta-learning system according to the first aspect of the present invention, a learning strength penalizing module is provided adapted to associate a penalty with a current magnitude of the learning strength.

In a still further possible embodiment of the meta-learning system according to the first aspect of the present invention, the inner model function of the inner function computation module is trained to minimize the errors computed by the error computation module.

In a further possible embodiment of the meta-learning system according to the first aspect of the present invention, the state update module is configured to update its state depending on the gradient of the error with respect to the model parameters.

Figure 2:
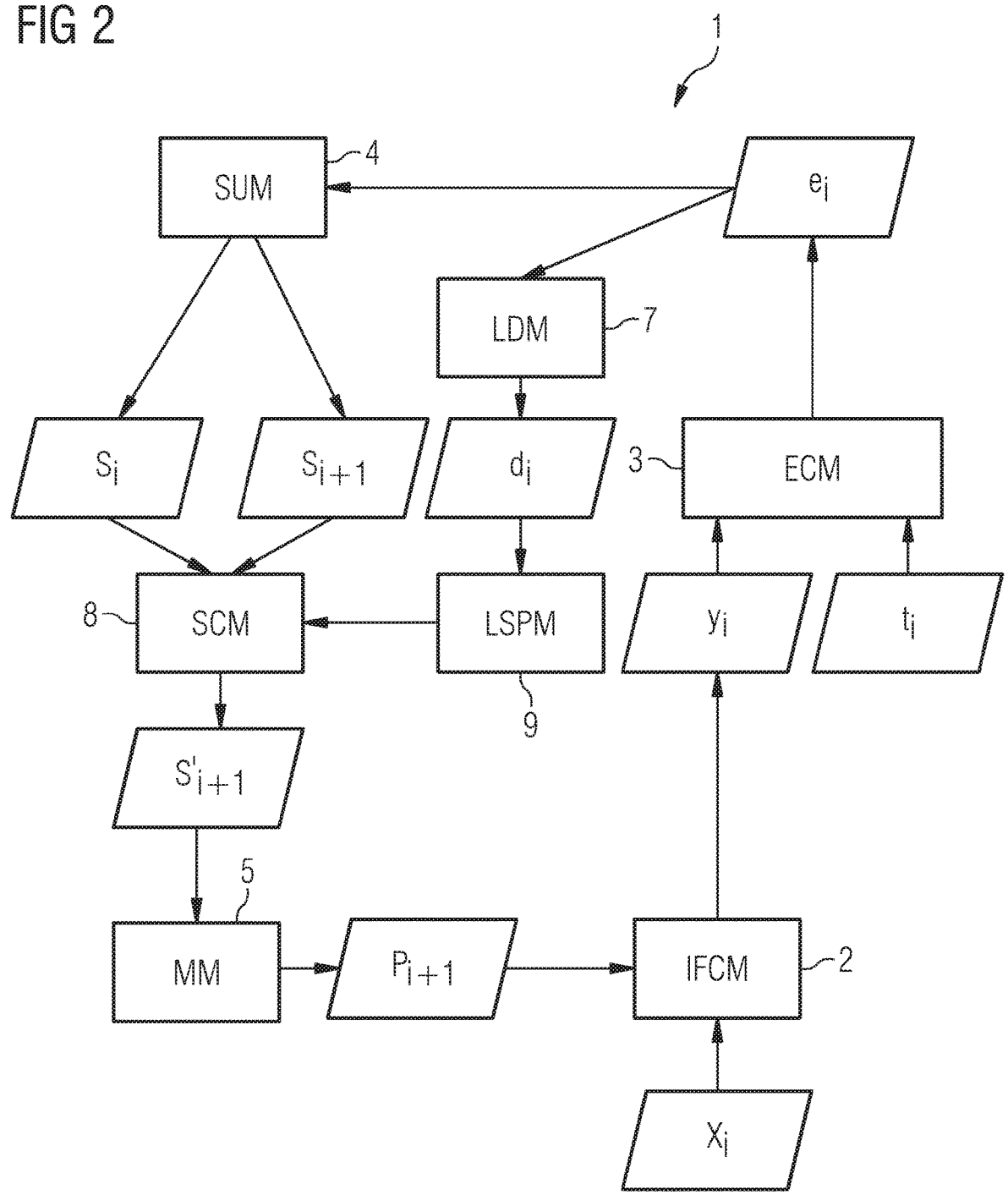
FIG. 2 shows a further schematic diagram for illustrating a further possible example alternative embodiment of the meta-learning according to the present invention.

FIGS. 1, 2 illustrate schematic diagrams for illustrating two possible variants or embodiments of a meta-learning system 1 according to an aspect of the present invention.

The meta-learning system 1 comprises as main components an inner function computation module (IFCM) 2, an error computation module (ECM) 3 and a state update module (SUM) 4. These modules 2, 3, 4 are provided in both embodiments as illustrated in FIGS. 1, 2. The inner function computation module (IFCM) 2 is adapted to compute output data y from applied input data x according to an inner model function F depending on model parameters p as shown in FIGS. 1, 2. The error computation module (ECM) 3 of the meta-learning system 1 is configured to compute errors e indicating mismatches between the computed output data y and target values t indicating current target data. The computed errors e are supplied to the state update module (SUM) 4 as illustrated in FIGS. 1, 2. The state update module 4 is adapted to update model parameters p of the inner model function F of the inner function computation module (IFCM) 2 according to an updated state $s_{i+1}$ which is updated based on the current state $s_i$ of the state update module (SUM) 4 in response to the calculated error e received from the error computation module (ECM) 3. The state update module (SUM) 4 is learned to adjust the model parameters p of the inner model function F such that a following training of the inner model function F within the inner function computation module (IFCM) 2 with training data is improved or even optimized.

The inner model function F of the inner function computation module (IFCM) 2 can transform a current input data x at time step i ($x_i$) into output data $y_i$ for the respective time step. The inner model function F also depends on parameters that are chosen by an optimizer formed by the state update module (SUM) 4 which is trained.

The output data $y_i$ depends on the input data $x_i$ and the adjusted parameters $p_i$ as follows:

$$y_i = F(x_i, p_i) \tag{1}$$

The inner model function F of the inner function computation module (IFCM) 2 comprises in a possible embodiment a neural network NN. This neural network NN can be formed in a possible implementation by a deep neural network comprising several layers. The deep neural network can comprise dense, convolution and other layers. In this case, the weights and biases of the neural network NN form the parameters p for the meta-learning system 1. The neural network NN comprises weights w and biases b which can be changed according to the updated state s of the state update module (SUM) 4.

Parameter updates which correspond to training in a normal system are performed in a possible embodiment based on the value provided by an error function which does indicate a mismatch between the computed output $y_i$ and the target value $t_i$ at a time step i.

The error function $e_i$ computed by the error computation module (ECM) 3 can be expressed as follows:

$$e_i = e(y_i, t_i) \tag{2}$$

The state update module (SUM) 4 which forms an optimizing unit of the system 1 receives the calculated error value $e_i$ and has also access in a possible embodiment to the gradient of the calculated error value $e_i$ with respect to the parameters $p_i$. In each time step, the state update module (SUM) 4 can compute new states $s_{i+1}$ based on a current state $s_i$. The new state $s_{i+1}$ can be mapped to the parameters $p_{i+1}$ which are used by the inner model function F in the next time step via a mapping function h. As illustrated in the embodiments of FIG. 1, FIG. 2, the meta-learning system 1 comprises in a possible embodiment a state to parameter mapping module (MM) 5 adapted to map the updated state $s_{i+1}$ of the state update module (SUM) 4 to the model parameters $p_{i+1}$ used by the inner model function F of the inner function computation module (IFCM) 2 in the next time step. The parameter mapping module (MM) 5 is adapted to map the updated state $s_{i+1}$ of the state update module (SUM) 4 to the model parameters $p_{i+1}$ used by the inner model function F of the inner function computation module (IFCM) 2 in the next time step according to a predetermined mapping function h.

$$p_{i+1} = h(s_{i+1}) \tag{3}$$

In a possible embodiment, the predetermined mapping function h can also be formed by an identity function. In this embodiment, the optimizer formed by the state update module (SUM) 4 does directly produce the new parameters $p_{i+1}$ for the inner function computation module (IFCM) 2.

By updating the parameters p, the system can adapt the behaviour of the function F to match a sequence of input data x and target values t as they are provided to the system. Once the optimizer SUM 4 has been run on enough labelled data, parameter updates can be disabled. Then, the system can predict outputs given input data x without needing further target values t to be supplied. The system 1 can be switched between an inference mode and a training mode depending on the availability of target values t as inputs.

A key observation from biological systems used by the meta-learning system 1 according to an embodiment of the present invention is that learning tends to be expensive and should be avoided. For instance, humans or animals may experience negative emotions when their observations do not match their internal model of the world or their plans. These negative emotions tend to cause an adaption of the world model, i.e. a learning takes place. This is associated with a higher attention state and an increased energy expenditure. On the other hand, if the world model predictions match well with observations, the respective animal is calmer and more content which is associated with less energy expenditure.

The meta-learning system 1 according to an embodiment of the present invention incorporates this insight by not only penalizing errors made but also by penalizing the learning itself. Learning is associated with change in the parameters $p_i$ during operation of the system. By penalizing errors and learning, it is assured in the meta-learning system 1 according to the present invention that only learning that leads to error reductions in the future is favoured.

In the meta-learning system 1 as illustrated in the embodiment of FIG. 1, the state update module (SUM) 4 has a state s which is based on the current prediction error e, the previous state as well as other factors. In a possible embodiment, the updated new state $s_{i+1}$ depends, inter alia, on the current state $s_i$ and the current prediction error $e_i$ provided by the error computation module (ECM) 3 as follows:

$$s_{i+1} = s(s_i, e_i \ldots) \tag{4}$$

The new updated state $s_{i+1}$ of the state update module (SUM) 4 depends on the current state $s_i$, the current prediction error $e_i$ and may depend on other factors as indicated in equation (4) above. The updated new state $s_{i+1}$ can be combined in a possible embodiment with the existing current state $s_i$ as performed in the embodiment of FIG. 2. Further, the new calculated state $s_{i+1}$ can form the input to the state to parameter mapping module (MM) 5 which produces the actual parameters $p_{i+1}$ for the inner model function F as indicated in equation (3) above. This makes it possible to have complex models for the inner function F with many parameters while the state which is the output of the state update model (SUM) 4 can be less complex. An insight here is also that for a given class of problems and model complexity, the state to parameter mapping module function h can supply initial parameters p for the inner model function F.

In the illustrated embodiment of FIG. 1, a state change penalizing module (SCPM) 6 is provided. Based on the current prediction error $e_i$ and potential other inputs, the state update module (SUM) 4 can compute a new updated state $s_{i+1}$ which becomes the current state in the next time step $s_{i+1}$. Other possible inputs to the state update module (SUM) 4 can be for example target values t, the input data x or any transformation of it. This transformation can also depend on the model parameters p. In a special implementation, the state update module (SUM) 4 can dynamically choose how it can transform the input to get transformation for its specific task.

As illustrated in FIG. 1, the current state of the state update module (SUM) 4 can be mapped to the model parameters p via the state to parameter mapping module (MM) 5 according to the predetermined mapping function h as indicated in equation (3). The model parameters $p_i$ determine the operation of the inner model function F. In the illustrated embodiment of FIG. 1, the state change penalizing module (SCPM) 6 is adapted to compare the newly generated state $s_{i+1}$ and the current state $s_i$ of the state update module (SUM) 4 and associates a penalty $z_i$ with a change in state s. This is because the degree to which the state s of the system 1 does change over time is seen as how much the system 1 learns. In the meta-learning system 1 according to the present invention, this learning is penalized (all other things being equal) such that the system 1 strives to produce good results without performing much learning. The objective function for training the meta-learning system 1 consequently is a combination of minimizing the overall prediction error $e_i$ but also the overall change in state as expressed by the state change penalty $z_i$. In a possible embodiment, the two goals can be weighted using a factor α such that:

$$s = \Sigma_i (e_i + \alpha z_i) \quad (5)$$

The state change penalizing module (SCPM) 6 is mainly used for training the meta-learning system 1 as its output forms part of the loss for the meta-learning optimization problem. The inner model function F of the inner function computation module (IFCM) 2 can be trained to minimize the errors e computed by the error computation module (ECM) 3 and simultaneously to minimize changes in the state s of the state update module (SUM) 4 expressed by associated state change penalties $z_i$ calculated by the state change penalizing module (SCPM) 6.

FIG. 2 shows a second example embodiment of the meta-learning system 1 according to the present invention. Similar to the embodiment in FIG. 1, the meta-learning system 1 comprises in the illustrated embodiment of FIG. 2 an inner function computation module (IFCM) 2, an error computation module (ECM) 3, a state update module (SUM) 4 and a state to parameter mapping module (MM) 5. In the second example embodiment of FIG. 2, the goal of penalizing the current amount learned by the system 1 is achieved by using a learning decision module (LDM) 7. Based on the calculated prediction error e and other factors, the learning decision module (LDM) 7 can compute values $d_i$ in [0;1] that signals the learning strength.

The state update module (SUM) 4 is adapted to compute a new state $s_{i+1}$ as in the embodiment of FIG. 1. However, in the meta-learning system 1 as illustrated in the embodiment of FIG. 2, the previous state $s_i$ and the new current state $s_{i+1}$ are combined in a state combination module (SCM) 8 taking into account the learning strength $d_i$. For example, a calculated learning strength $d_i=0$ may lead to the new calculated state $s_{i+1}$ being ignored and the output being equal to the previous old state $s_i$. In contrast, if the calculated learning strength $d_i$ calculated by the learning decision module (LDM) 7 is $d_i=1$ this can lead to the output of the state combination module (SCM) 8 to be the new state s. An example combination rule implemented by the state combination module (SCM) 8 can be for instance:

$$s_{i+1'} = d_i \times s_{i+1} + (1 - d_i) \times s_i \quad (6)$$

The state combination module (SCM) 8 of the embodiment illustrated in FIG. 2 is adapted to combine the current state $s_i$ and the updated state $s_{i+1}$ received from the state update module (SUM) 4 using the learning strength $d_i$ provided by the learning decision module (LDM) 7 to adjust the updated state $s_{i+i'}$ applied to the state to parameter mapping module (MM) 5. In the illustrated embodiment of FIG. 2, the meta-learning system 1 can comprise a learning strength penalizing module (LSPM) 9 adapted to compare an updated learning strength $d_{i+1}$ and a current learning strength $d_i$ and to associate a learning strength penalty with an observed change of the learning strength.

Penalizing the amount learned in addition to overall error can be achieved using the learning strength d in the training stage of the meta-learning system 1 such that:

$$\text{Loss} = \Sigma_i (e_i + \alpha d_i) \quad (7)$$

becomes minimal.

The inner model function F of the inner function computation module (IFCM) 2 can be trained to minimize the errors $e_i$ computed by the error computation module (ECM) 3 and to minimize the overall sum over all time steps of the learning strength d provided by the learning decision module (LDM) 7 expressed by the associated learning strength penalties provided by the learning strength penalizing module (LSPM) 9.

In a possible embodiment of the meta-learning system 1 according to the present invention, two phases can be distinguished. In a first learning phase, the state update module (SUM) 4 is learned using labelled learning data applied to adjust the model parameters p of the inner model function F within the inner function computation module (IFCM) 2. Further, in a subsequent training phase following the learning phase, the inner model function F of the inner model function module (IFCM) 2 is then trained using training data applied to the inner function computation module (IFCM) 2.

In a possible embodiment, training of the meta-learning system 1 can be done using sequences of inputs x and outputs y from many different problems. It can be useful to combine sequences from different problems into mini-batches to perform a stochastic gradient descent. Given enough different training problems, the meta-learning system 1 can then generalize and learn from sequences from unseen problems.

As an example of applying the system to a class of problems, the MNIST image data set can be used. This image data set contains handwritten images of the digits 0 to 9. The inner model function F can for example be setup as a binary classifier for distinguishing two different digits. The system is supposed to learn from a short sequence of labelled examples. Once the system has learned, the updating may be turned off and the inner model function F of the inner function computation module (IFCM) 2 can be run on its own. For example, given ten digits, the number of different binary classification problems between digits which can be constructed from this is e.g. 10×9=90. For training the meta-learning system 1, for example, a subset of problems can be used (e.g. 1 vs. 3, 4 vs. 5).

A disjoint subset of problems can be used for evaluation such that the evaluation set contains only unseen digits (e.g. all problems with digits 0 to 6 for training and all problems with digits 7 to 9 for evaluation. For training, one fixed length sequence of input/output pairs can act as single input to the meta-learning system 1. Multiple of these inputs from different problems can then be put into a mini-batch and used for updating the parameters p of the meta-learning system 1 according to the above-described loss functions. After training, the system can be applied to variable length sequences of unseen example sequences from unseen digit classes. It can be shown from experiments that the meta-learning system 1 can reach average classification rates of 90% on sequences with a length of 64. This means that with only 64 examples, the system is able to learn the unknown problem such that over all 64 sequence examples the mean correct rate is that high.

The meta-learning system 1 according to an embodiment of the present invention can also be used in a similar way, for instance with a CIFAR100 data set. The meta-learning system 1 according to an embodiment of the present invention is not limited to classification problems but can learn to associate any outputs with inputs. The meta-learning system 1 according to an embodiment of the present invention can be used but is not limited to segmentation, regression, registration, etc. The meta-learning system 1 shows a remarkable ability to quickly learn to solve unseen problems from the same problem class as problems that have been used during training.

In the meta-learning system 1 according to an embodiment of the present invention, the amount learned is penalized in addition to the overall calculated prediction error e. By penalizing the amount learned in addition to the overall prediction error e of the system 1, the meta-learning system 1 incentivizes not to make unnecessary updates while still minimizing the error e. The meta-learning system 1 according to an embodiment of the present invention can operate in an online setting where input data is changing all the time and can therefore be considered as unseen data. In this setting, the state update module (SUM) 4 does perform only updates that will help in predicting future unseen data. Penalizing updates is therefore a way to incentivize the quality of updates of the system 1 further than just by penalizing the overall error e.

Accordingly, the meta-learning system 1 according to an embodiment of the present invention is able to learn very quickly to solve problems by looking at only a few examples or data sets of input/output data pairs. The meta-learning system 1 can be used in many areas, especially in any use case where there is little training data but much data for similar problems. The meta-learning system 1 is adapted to provide meta-learning, e.g. learning to learn. A network or model is trained that will train another model in its inference. Instead of employing standard mathematical optimizers for training, the meta-learning system 1 according to an embodiment of the present invention allows to learn the optimizer itself.

The meta-learning system 1 according to an embodiment of the present invention can quickly learn to solve a problem given a limited training data set. The meta-learning system 1 according to an embodiment of the present invention allows to train a meta-model on a set of problems which also works well when applied to an unseen problem. The meta-model with attributes can be constructed and applied to complex real world problems in an efficient way. This can also be performed online. The meta-learning system 1 according to an embodiment of the present invention can be used for a wide range of use cases and/or different problem classes including landmark detection, computer-aided diagnostics, segmenting image registration or any kind of classification.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A meta-learning system, comprising:
processing circuitry configured to,
compute output data from applied input data according to an inner model function, the inner model function depending on model parameters,
compute an error indicating a mismatch between the output data and a target value, and
update the model parameters of the inner model function according to an updated state, the updated state being based on a current state and the error, first training is performed to adjust the model parameters before second training the inner model function, the second training of the inner model function being to minimize an overall sum of a learning strength over time, the second training including minimizing the following function:

$$\text{Loss} = \Sigma_i (e_i + \alpha d_i)$$

i representing a respective time, $e_i$ representing the error at the respective time, $d_i$ representing the learning strength at the respective time, and $\alpha$ representing a weighting factor.

2. The meta-learning system of claim 1, wherein
the first training is performed using labelled learning data applied to adjust the model parameters; and
the second training of the inner model function is performed using training data.

3. The meta-learning system of claim 1, further comprising:
a neural network implementing the inner model function.

4. The meta-learning system of claim 3, wherein
the model parameters of the neural network include weights and biases; and
the processing circuitry is configured to update the model parameters by changing the weights and biases according to the updated state.

5. The meta-learning system of claim 1, wherein the processing circuitry is configured to map the updated state to the model parameters.

6. The meta-learning system of claim 5, wherein the processing circuitry is configured to map the updated state to the model parameters according to a mapping function.

7. The meta-learning system of claim 6, wherein the mapping function is an identity function.

8. The meta-learning system of claim 1, wherein the processing circuitry is configured to compute a current magnitude of a current learning strength based on the error.

9. The meta-learning system of claim 8, wherein the processing circuitry is configured to map one of the current state or the updated state to the model parameters based on the current magnitude of the current learning strength.

10. The meta-learning system of claim 9, wherein the overall sum of the learning strength over time corresponds to a plurality of learning strength penalties, each of the plurality of learning strength penalties corresponding to a change between the current magnitude of the current learning strength and a previous magnitude of a previous learning strength.

11. The meta-learning system of claim 1, wherein the processing circuitry is configured to determine the updated state depending on a gradient of the error with respect to the model parameters.

12. The meta-learning system of claim 3, wherein the neural network is a deep neural network.

13. The meta-learning system of claim 12, wherein
the model parameters of the deep neural network include weights and biases; and
the processing circuitry is configured to update the model parameters by changing the weights and biases according to the updated state.

14. The meta-learning system of claim 2, wherein the processing circuitry is configured to map the updated state to the model parameters.

15. The meta-learning system of claim 14, wherein the processing circuitry is configured to map the updated state to the model parameters according to a mapping function.

16. The meta-learning system of claim 15, wherein the mapping function is an identity function.

17. The meta-learning system of claim 2, wherein the processing circuitry is configured to compute a current magnitude of a current learning strength based on the error.

18. The meta-learning system of claim 5, wherein the processing circuitry is configured to compute a current magnitude of a current learning strength based on the error.

19. The meta-learning system of claim 3, wherein the processing circuitry is configured to compute a current magnitude of a current learning strength based on the error.

20. The meta-learning system of claim 11, wherein the processing circuitry is configured to compute a current magnitude of a current learning strength based on the error.

21. The meta-learning system of claim 20, wherein the processing circuitry is configured to map one of the current state or the updated state to the model parameters based on the current magnitude of the current learning strength.

22. The meta-learning system of claim 21, wherein the overall sum of the learning strength over time corresponds to a plurality of learning strength penalties, each of the plurality of learning strength penalties corresponding to a change between the current magnitude of the current learning strength and a previous magnitude of a previous learning strength.

23. The meta-learning system of claim 4, wherein the processing circuitry is configured to compute a current magnitude of a current learning strength based on the error.

24. The meta-learning system of claim 23, wherein the processing circuitry is configured to map one of the current state or the updated state to the model parameters based on the current magnitude of the current learning strength.

25. The meta-learning system of claim 24, wherein the overall sum of the learning strength over time corresponds to a plurality of learning strength penalties, each of the plurality of learning strength penalties corresponding to a change between the current magnitude of the current learning strength and a previous magnitude of a previous learning strength.

26. The meta-learning system of claim 10, wherein the processing circuitry is configured to compute the previous magnitude of the previous learning strength based on a previous error.

27. The meta-learning system of claim 1, wherein the first training is performed by applying labelled learning data to adjust the model parameters of the inner model function.

28. The meta-learning system of claim 2, wherein the first training is performed by applying labelled learning data to adjust the model parameters of the inner model function.

* * * * *